US005402949A

United States Patent [19]
Berner et al.

[11] Patent Number: 5,402,949
[45] Date of Patent: Apr. 4, 1995

[54] ICE SHAVING APPARATUS

[75] Inventors: John M. Berner, Golden Valley; Steve Wrobel, Rogers, both of Minn.; Richard D. Ipsen, 720 Windemere Curve, Plymouth, Minn. 55441; Thomas J. Novetzke, 5621 14th Ave. South, Minneapolis, Minn. 55417

[73] Assignees: Richard D. Ipsen; Thomas J. Novetzke, both of Minneapolis, Minn.

[21] Appl. No.: 159,787

[22] Filed: Nov. 30, 1993

[51] Int. Cl.⁶ .................... B02C 19/08; B02C 23/00
[52] U.S. Cl. ...................... 241/101.2; 241/199.9; 241/285.1; 241/DIG. 17
[58] Field of Search .......... 241/100, 101.2, 199.9, 241/280, 285.1, 285.2, DIG. 17

[56] References Cited

U.S. PATENT DOCUMENTS

| D. 304,897 | 12/1989 | Lin . | |
|---|---|---|---|
| D. 305,602 | 1/1990 | Inomata . | |
| D. 318,776 | 8/1991 | Lin . | |
| D. 324,979 | 3/1992 | Aguirre . | |
| 3,679,140 | 7/1972 | Kaishita et al. . | |
| 4,569,266 | 2/1986 | Ando | 241/DIG. 17 X |
| 4,588,136 | 5/1986 | Homma | 241/DIG. 17 X |
| 4,718,610 | 1/1988 | Gallaher . | |
| 4,767,068 | 8/1988 | Ando . | |
| 5,007,591 | 4/1991 | Daniels, Jr. . | |
| 5,050,809 | 9/1991 | Rupp . | |

FOREIGN PATENT DOCUMENTS

| 658061 | 7/1928 | France | 83/62 |

OTHER PUBLICATIONS

Hatsuyuki Ice Shaver Sales Brochure.
Hatsuyuki Ice Shavers Sales Brochure.
Swan Ice Shaver Sales Brochure.
Swan SI-100E Ice Shaver Instruction Manual.
Hatsuyuki Model FH-500E Ice Shaver Instruction Manual.
Swan SI-100E Drawings and parts list.

*Primary Examiner*—Timothy V. Eley
*Attorney, Agent, or Firm*—Palmatier, Sjoquist & Helget

[57] ABSTRACT

The present invention is an ice shaving apparatus comprising an oval shaped base with an oval shaped ice block shaving table mounted directly above the base by way of four tubular legs, an oval shaped upper plate mounted directly above the ice block shaving table by way of four additional tubular legs collinear with the lower four legs, threaded rods extending through the tubular legs, a motor, a gearbox, and a rack and pinion mechanism are mounted on the upper plate coupled to a vertically movable shaft and ice pick disk extending downward towards the ice block shaving table to engage and rotate the block of ice on the shaving table. The motor, electrical circuitry, the gearbox, and the rack and pinion mechanism are all located above the upper plate and are enclosed by a single housing. The ice block shaving table has a radially oriented elongate slot with a stationary angular shaving blade extending out of the slot. Rotation of the block of ice on the support table causes the shaving blade to cut shavings from the block of ice. The shavings then fall downwardly through the slot toward the base. Optimal visibility, use of space, structural integrity, stability and access is afforded by the configuration.

22 Claims, 7 Drawing Sheets

ICE SHAVING APPARATUS

BACKGROUND OF THE INVENTION

This invention relates to apparatus for food service. More particularly it relates to ice shaving apparatus for producing ice shavings from a block of ice for making frozen drinks and the like.

Ice shaving apparatus are available in both domestic and commercial models. The commercial models typically are free-standing, are designed for operation on a table, include a base which sits on the table, an ice block shaving table supported above the base, the ice block shaving table showing a slit with a shaving blade extending upwardly through the slit, and a rotating shaft with an ice pick disk extending downward toward the ice shafting table to engage and rotate the block of ice, whereby shavings are produced at the shaving blade which fall through the slit toward the base. Such prior art shavers have a box-like frame or housing which extend upward from the base and which enclose the rear portion of the machine. Typically the box-like frame or housing encloses the motor, the drive coupling, switches, and circuit breakers.

In that these apparatus are essentially an appliance for use in the food service industry, cleanliness and safety are of the utmost importance. The box-like frame or housing creates areas which are not visible or accessible without disassembly. The housing is located at the same level and below the area that the ice is being processed. This configuration presents difficulties in clean up such as determining whether the nonvisible, inaccessible areas inside the housing need cleaning or other attention. The prior art configuration also can present safety concerns due to the electrical circuitry, including the switching, being located in the proximity of or below the region where the ice is processed. In that the food product being produced is shaved ice, water is also generated and this can be a significant hazard where electrical circuitry is present.

Oftentimes the commercial embodiments of this equipment is utilized in concessionaire booths at fairs, carnivals, and the like. The booths are thus fast paced and may have several employees working about a single machine. The income generated by the booths is directly related to producing and selling shaved ice at the highest rate possible. A high level of reliability along with easy and quick maintenance are desirable.

The concessionaires' booths may often be approachable by customers from all four sides. In such arrangements the ice shaver would typically be centrally located and viewable from all sides. Visual display of the food product can be an important means of attracting potential customers. With the closed rear housing of the prior art equipment, viewing of the food product from rearward angles is impossible or severely restricted. Additionally, the closed rear space prevents the operators behind the apparatus from observing the operating status of the machine such as the amount of accumulated shaved ice below the shaving table or the size of the remaining ice block. In such environments it is also important that the apparatus be extremely stable on the table on which it sits.

Additionally, with the housing taking up a substantial portion of the base in prior art machines, space for the temporary accumulation and storage of shaved ice product below the shaving table is severely limited.

SUMMARY OF THE INVENTION

The present invention is an ice shaving apparatus comprising an oval shaped base with an oval shaped ice block shaving table mounted directly above the base by way of four tubular legs, an oval shaped upper plate mounted directly above the ice block shaving table by way of four additional tubular legs collinear with the lower four legs, threaded rods extending through the tubular legs, a motor, a gearbox, and a rack and pinion mechanism are mounted on the upper plate coupled to a vertically movable shaft and ice pick disk extending downward towards the ice block shaving table to engage and rotate the block of ice on the shaving table. The motor, electrical circuitry, the gearbox, and the rack and pinion mechanism are all located above the upper plate and are enclosed by a single housing. The ice block shaving table has a radially oriented elongate slot with a stationary angular shaving blade extending out of the slot. Rotation of the block of ice on the support table causes the shaving blade to cut shavings from the block of ice. The shavings then fall downwardly through the slot toward the base. Optimal visibility, use of space, structural integrity, stability and access is afforded by the configuration.

An advantage and feature of the invention is that the rotating ice pick disk and ice block on the shaving table are visible from 360° around the apparatus.

Another advantage and feature of the invention is that the shaved ice receiving area below the shaving table is visible a full 360° around the apparatus.

Another feature and advantage of the invention is that the absence of a rearward housing or frame on the base plate provides additional room for accumulation and temporary storage of shaved ice.

An additional advantage and feature of the invention is that the drive motor, the gearbox, the rack and pinion mechanism and brake mechanism for the rack are all located above the upper plate allowing total access to all of the powered or driven mechanical apparatus and the electrical circuitry by way of removal of a single housing member. This feature simplifies and expedites the maintenance and repair of the device.

An additional advantage and feature of the invention is that all of the electrical circuitry including the electrical connections may be located above the upper plate and therefore above and totally isolated from the ice shaving area and potential water hazard.

An additional advantage and feature of the invention is that substantially all areas of the equipment at the level of or below the ice pick disk are immediately accessible and visible for cleaning.

Another additional advantage and feature of the invention is that the base, the shaving table, the upper plate, the four upper legs and the four lower legs are all joined together by way of four threaded connecting rods with cooperating nuts which extend through, provide compressive force, and lock together the upper plate, the upper legs, the shaving table, the lower legs and the base. This configuration provides the advantage and feature of superior structural integrity and minimum opportunity for the various connecting parts to come loose. Additionally, if disassembly is desired for shipping or storage, the apparatus is easily broken down by removal of the nuts on the threaded rods.

An additional advantage and feature of the invention is the transparent, snap-in, lower shield which is easily removable and preserves the visually open back and sides around the shaved ice receiving area.

DETAILED DESCRIPTION OF THE PREFERRED EMBODIMENTS

Figure 1:
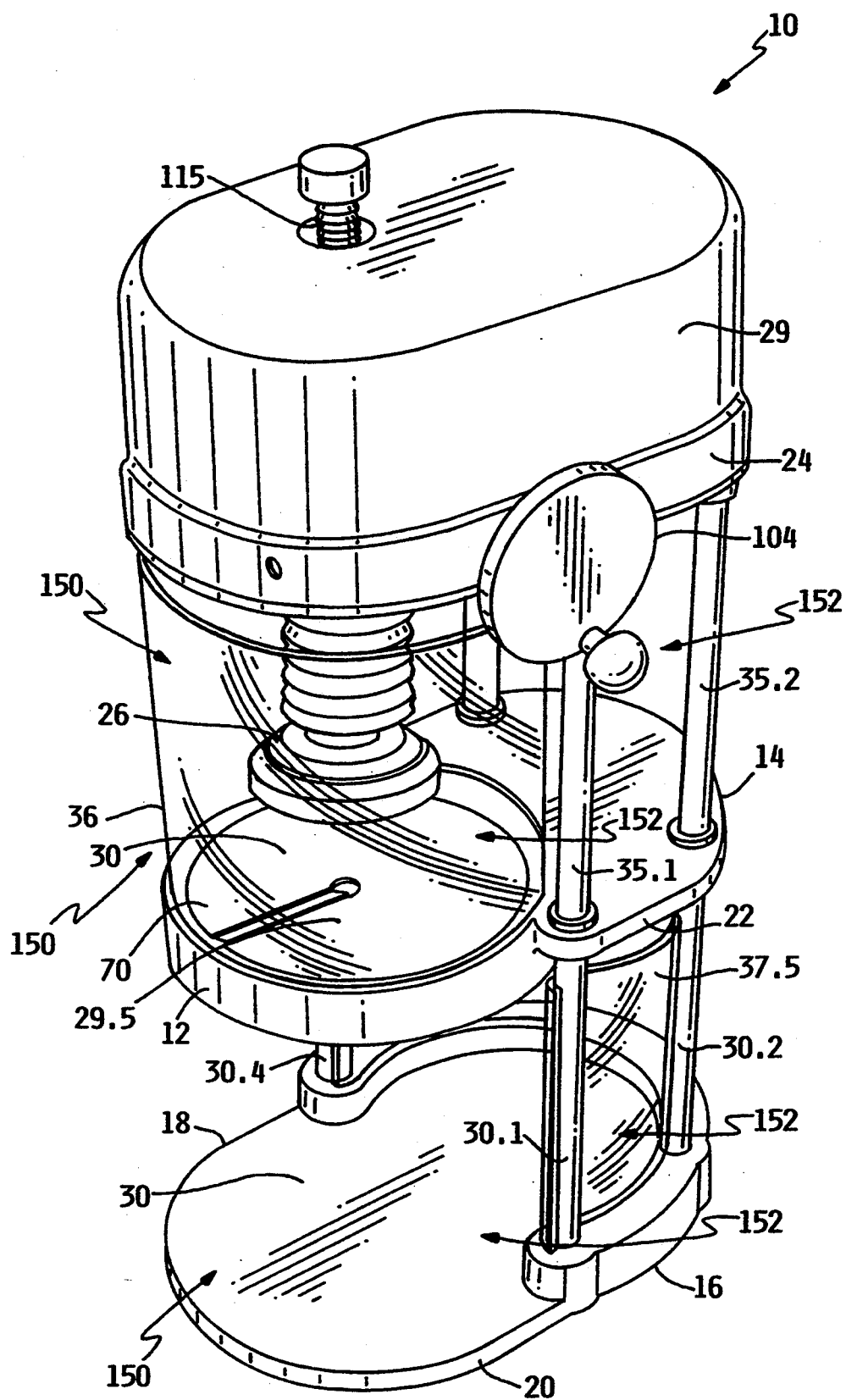
FIG. 1 is a perspective of the invention.
Figure 2:
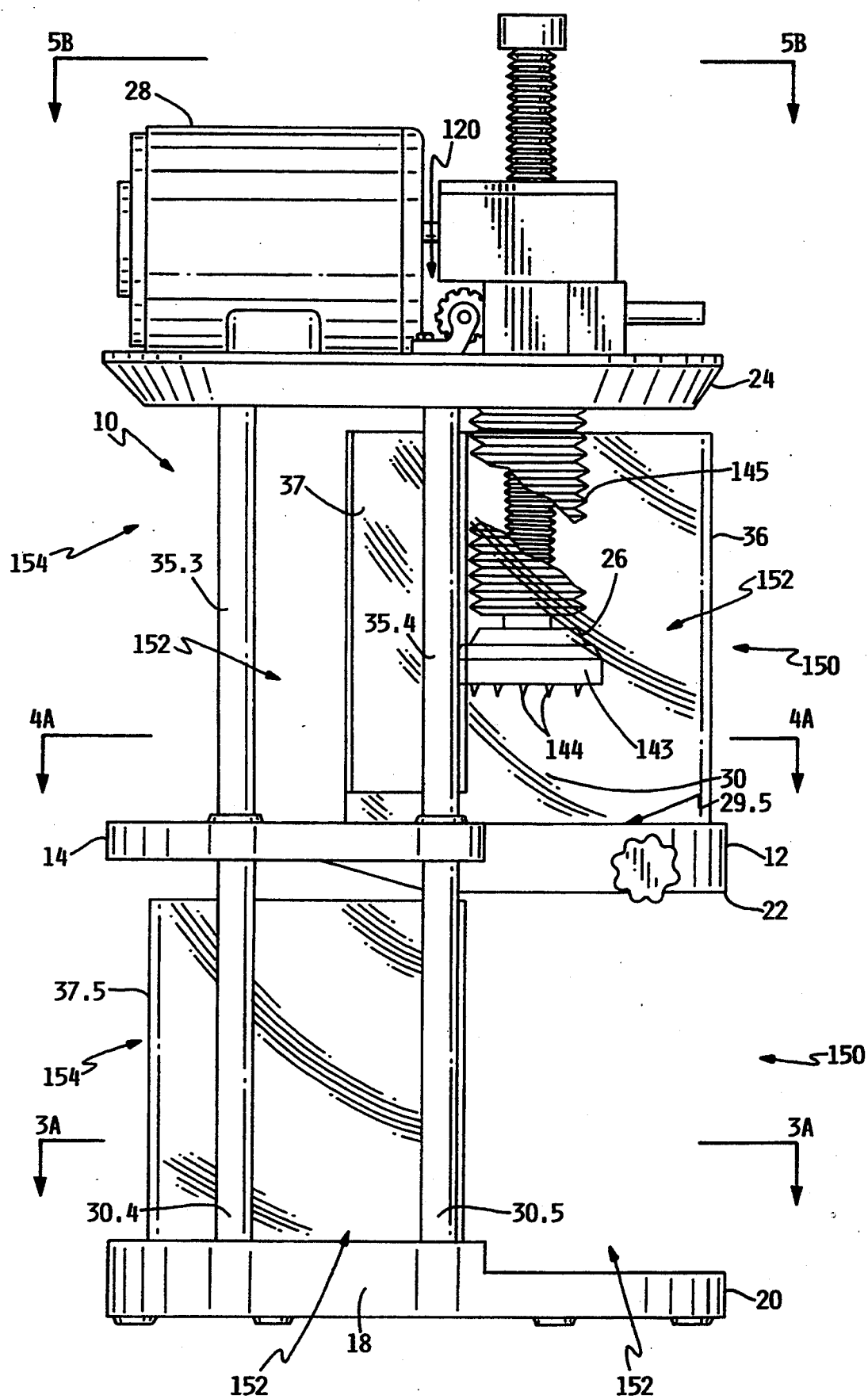
FIG. 2 shows a side elevational view of the invention with the housing removed revealing the drive motor and gearbox and the rack and pinion mechanism. The billows enclosing the rack below the upper mounting plate is broken away.

Referring to FIGS. 1 and 2, a perspective and a side elevation view of the preferred embodiment of the ice shaving apparatus is shown with the apparatus generally indicated by the numeral 10. The apparatus generally has a front 12, back 14, and two sides 16, 18. The device is principally comprised of a base 20, an ice block shaving table 22, an upper plate 24, a rotating spindle 26, a drive motor 28 and a housing 29. The space between the upper plate and the ice block shaving table is the ice block receiving region 29.5. The region between the ice block shaving table and the base is defined as the shaved ice receiving area 30. The ice block shaving table 22 is supported by lower legs 30.1, 30.2, 30.3, 30.4. Similarly, the upper plate is supported by upper legs 35.1, 35.2, 35.3, 35.4.

A partial cylindrical transparent shield 36 slidably seats in the ice block shaving table to enclose the rotating spindle 26 and ice block (not shown). A stationary shield 37 extending between the two forward upper legs 35.1, 35.4 completes the cylindrical enclosure. A removable transparent C-shaped shield 37.5 snaps into engagement with the flower legs.

Figure 3A:
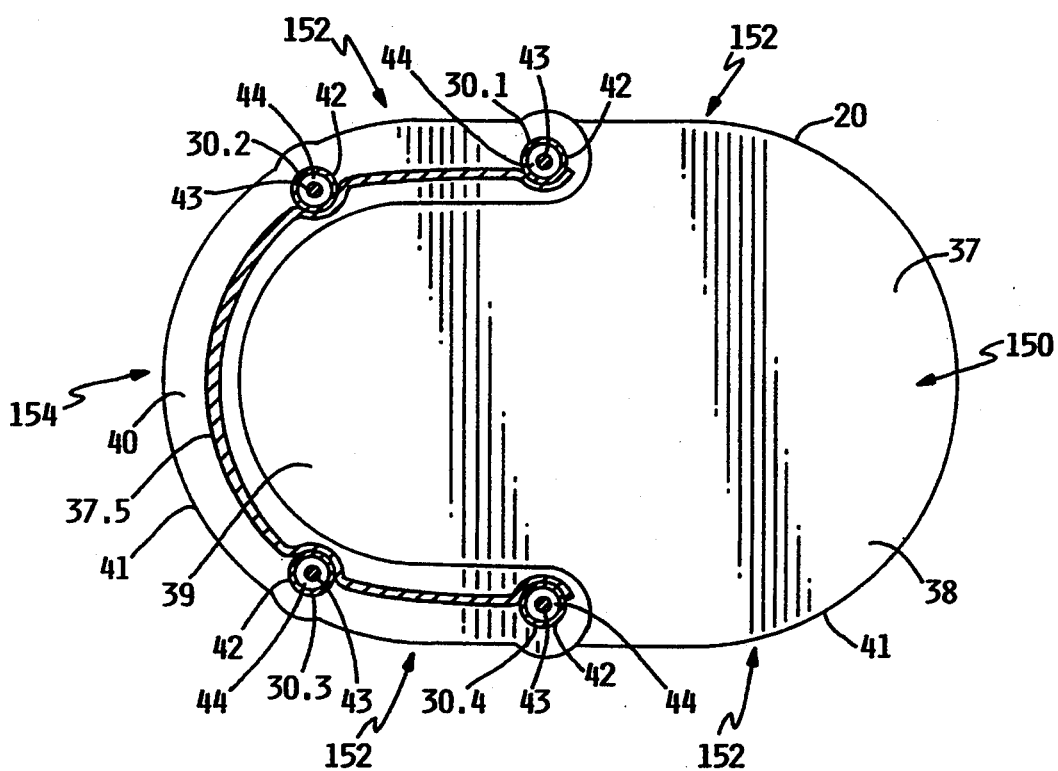
FIG. 3A shows a sectional taken at line 3A—3A of FIG. 2 showing the base.
Figure 3B:
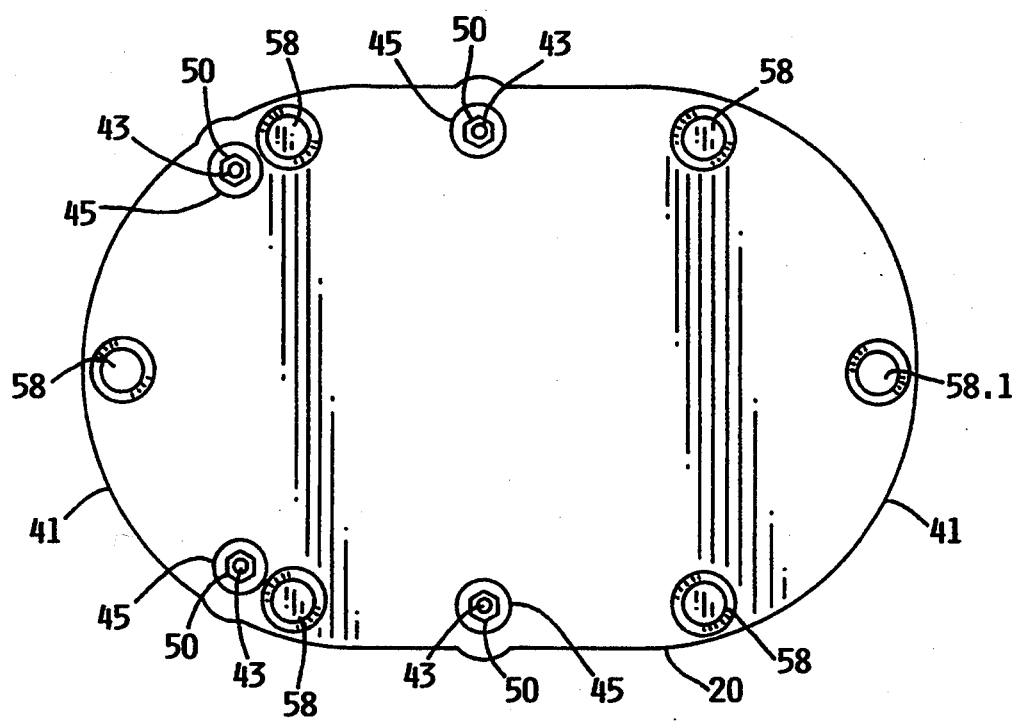
FIG. 3B shows a bottom view of the base.
Figure 6:
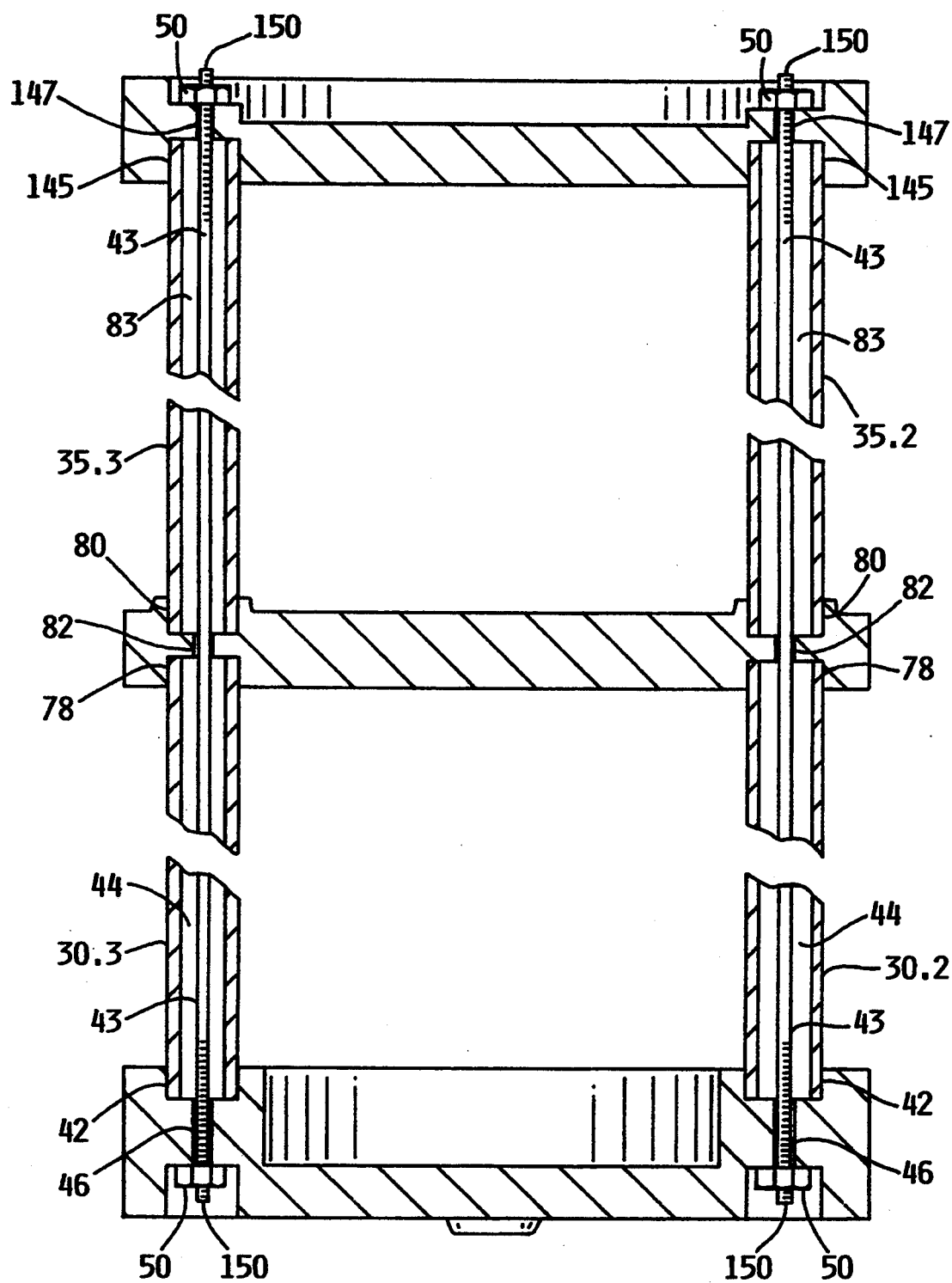
FIG. 6 is sectional view taken at plane 6—6 of FIG. 5C and shows the interrelationship of the base, the lower legs, the ice shaving plate, the upper legs, the upper plate, and the threaded rods.

In FIGS. 3A, 3B and 6 a top view, a bottom view, and a cross-sectional view of the base 20 are shown. The base generally has a forward portion 38, a rearward portion 39, a raised portion 40, and a substantially oval perimeter 41. Borings or cylindrical recesses are drilled or otherwise formed in the raised portion 40 to form four receptacles 42. The receptacles 42 are sized to receive and engage the lower legs 30.1, 30.2, 30.3, 30.4. Extending through the open interiors 44 of the tubular legs are threaded rods 43. The threaded rods 43 extend through the base 20 into recesses 45 in the bottom of the base 20 by way of holes 46 and are secured by nuts 50. The cross-sectional view in FIG. 6 best illustrates the engagement of the lower legs 30.1, 30.2, 30.3, 30.4 into the receptacles 42 and the threaded rods 43 with the nuts 50 securing the legs in the receptacles.

Shown in FIG. 3B are feet 58 adjacent to the perimeter 41 of the base 20 and a most forward foot 58.1. The feet 58, 58.1 are fabricated of rubber or the like and are attached to the base 20 by way of screws or other suitable means.

Figure 4A:
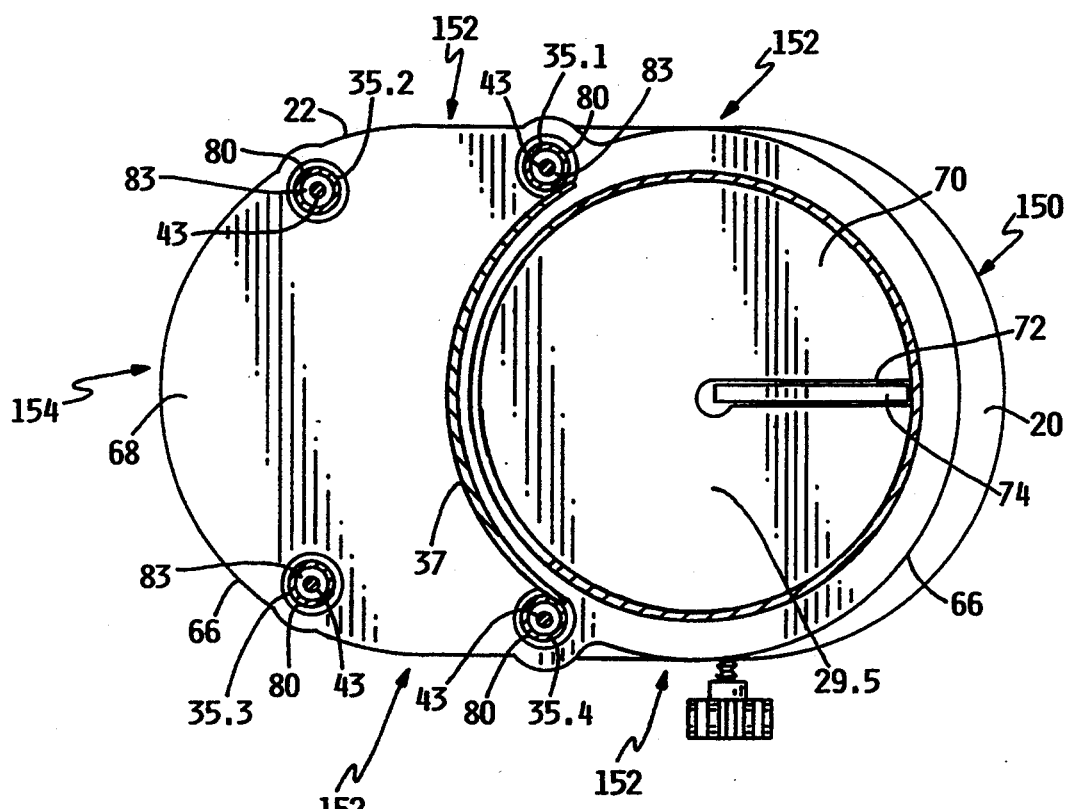
FIG. 4A is a sectional taken at plane 4A—4A of FIG. 2 and shows an upper view of the ice block shaving table.
Figure 4B:
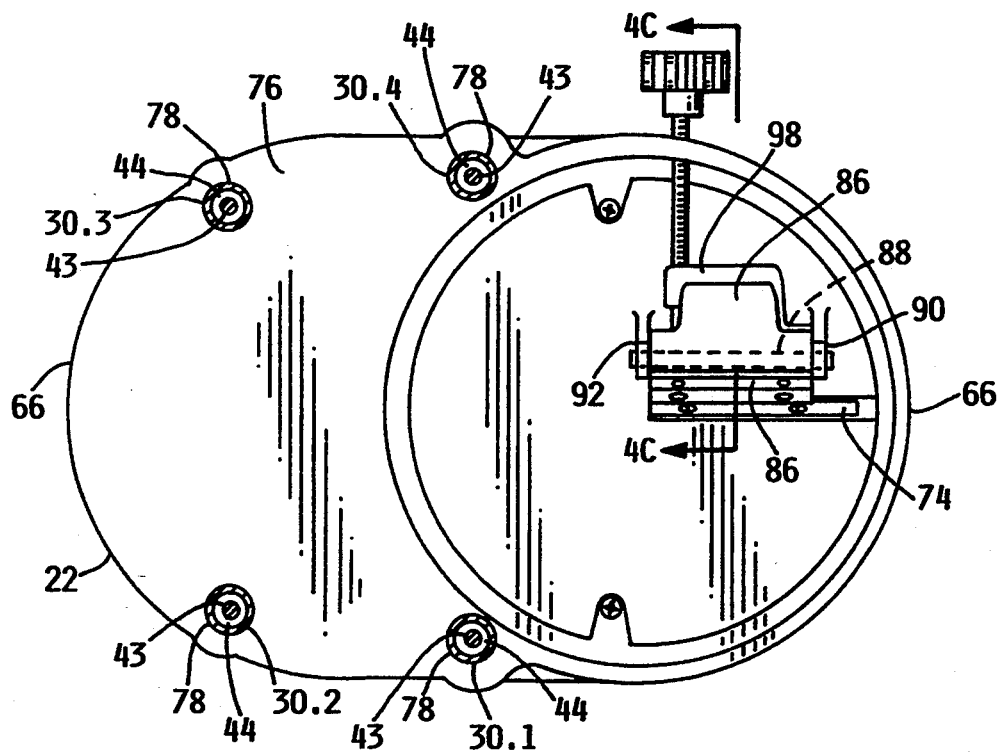
FIG. 4B shows a bottom view of the ice block shaving table.

Referring to FIGS. 4A, 4B, and 6, the ice block shaving table 22 is shown including a shaving blade mechanism 64. As seen in FIG. 4A the ice block shaving table 22 has a perimeter 66 which is substantially oval in shape and has a top surface 68 which includes an ice block shaving plate 70 upon which the ice block sits and rotates. The ice block shaving plate 70 has an elongate opening 72 through which extends a shaving blade 74. The shaving plate may be fabricated from stainless steel.

Referring specifically to FIGS. 4B and 6, the lower surface 76 of the ice block shaving table 22 has four receptacles 78 for receiving and seating the lower legs 30.1, 30.2, 30.3, 30.4.

The top surface 68 of the ice block shaving table 22 also has corresponding receptacles 80 which are in alignment with the receptacles 78 on a lower surface 76 and are connected by way of holes 82, which are oversized with respect to the threaded rods 43, as best shown in FIG. 6. The threaded rods 43 extend through the interiors 44 of the lower legs and through the ice block shaving table by way of the holes 82 and then upwardly through the interiors 83 of the upper legs 35.1, 35.2, 35.3, 35.4 which are seated in said receptacles 80.

Figure 4C:
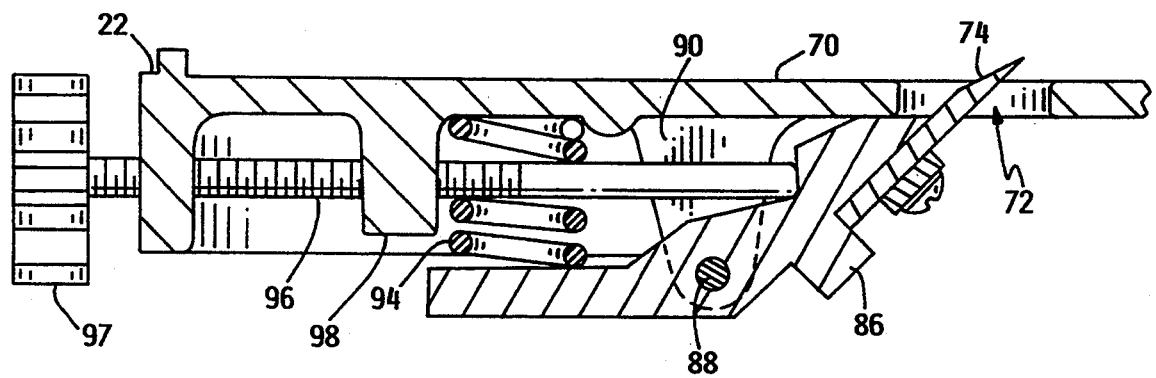
FIG. 4C shows a cross-sectional taken at plane 4C—4C of FIG. 4B.

Referring to FIGS. 4B and 4C, the shaving blade mechanism 64 is shown attached to the lower surface 76 of the ice block shaving table 22. The mechanism 64 is comprised of a shaving blade 74 which angles through the elongate opening 72 and is attached to a clamp piece 86 by screws 87. The clamp piece 86 pivots on a pin 88 which is mounted in two posts 90, 92. A spring 94 provides bias to urge the shaving blade upwardly through the opening 72. A threaded shaft 96 which is rotated by way of a knob 97 and engaged with threads in a post 98 forces the clamp piece 86 counter to the bias provided by the spring 94 to lower the shaving blade 74 with respect to the top surface 68 of the ice block shaving table 22.

Figure 5C:
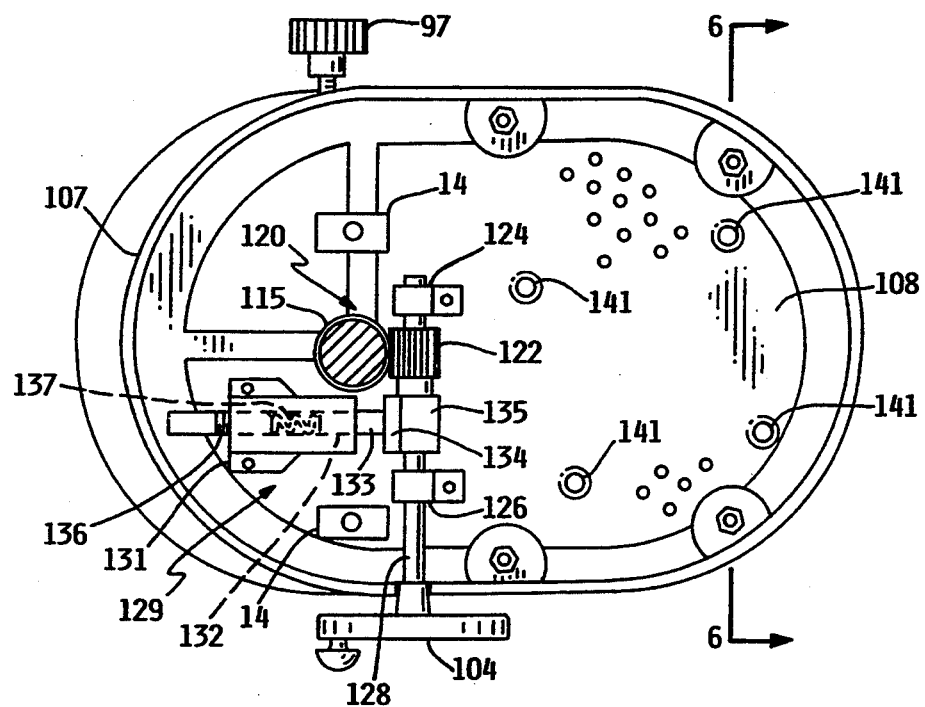
FIG. 5C shows the plan view of FIG. 5B with the motor and the gearbox removed to display the rack and pinion mechanism and the braking mechanism.
Figure 5A:
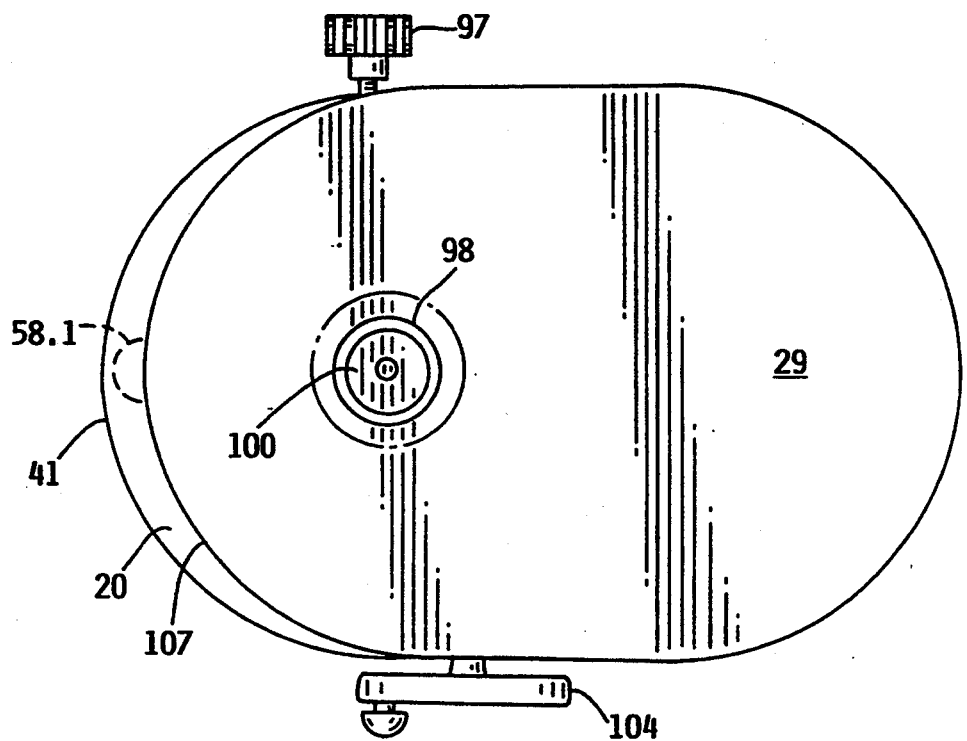
FIG. 5A shows a plan view of the invention with the housing in place.
Figure 5B:
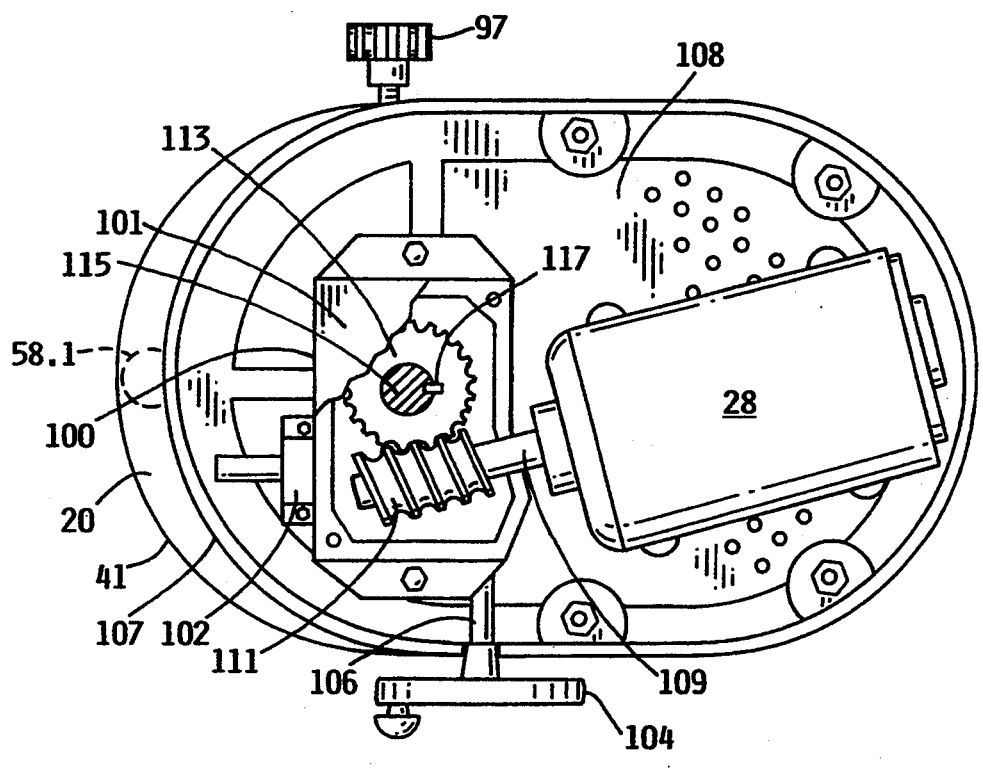
FIG. 5B shows a sectional taken at plane 5B—5B of FIG. 2 with the cover of the gearbox removed. This view is essentially the plan view of FIG. 5A with the housing removed.

Referring to FIGS. 5A, 5B and 5C, the upper plate 24 and the housing 29 are shown. FIG. 5A shows a top plan view of the apparatus 10 with the housing 29 in place. FIG. 5B shows essentially the same view but with the housing 29 removed revealing the upper plate 24, the motor 28, a coupling means comprising a gearbox 100, a gearbox lid 101, partially broken away, a portion of the braking mechanism 102, the crank 104, the crankshaft 106 and the upper surface 108 of the upper plate 24. FIG. 5C shows the same view of the upper plate 24 with the motor 28 and gearbox 100 removed. The upper plate 24 has a perimeter 107 substantially oval shaped similar to the ice block shaving table 22 and the base 20. Notably, the perimeter 41 of the base 20 extends forwardly beyond the perimeter 107 of the upper plate 24. The motor 28 is mounted to the upper plate 24 by way of screws or other suitable mounting means. The motor 28 has a shaft 109 which extends into the gearbox 100 and has fixed to the shaft 109 a worm gear 111. The worm gear 111 is engaged with a wheel gear 113 which slidably engages the threaded and keyed shaft 115 by way of the key 117. The threaded and keyed shaft 115 constitutes part of the spindle 26.

FIG. 5C shows the rack and pinion mechanism 120 which controls the vertical position of the shaft 109. The threaded and keyed shaft 115 constitutes the rack of the rack and pinion mechanism 120. The pinion gear 122 is mounted on a shaft 128 and connects to the crank 104. Shaft supports 124, 126 attached to the upper plates support the shaft 128.

The braking mechanism 129 is also shown in FIG. 5C and is generally positioned under the gearbox 100 which has been removed in this view. A mounting block 131 with a bore 132 is attached to the upper surface of the upper plate. A plunger 133 with a brake shoe 134 extends from one side of the bore 132 and the brake shoe 134 confronts a brake cylinder 135 fixed on the shaft 128. The plunger 133 is sized to be freely slidable within the bore 132. The threaded shaft 136 extends out the opposite end of the mounting block 131 and is engaged in the bore by way of threads in the bore 132. Positioned between the threaded shaft 136 and the plunger 133 is a spring 137 that biases the brake shoe 134 against the brake cylinder 135. Also shown on the upper surface 108 of the upper plate 24 are mounting posts 141 for attachment of the motor 28 and mounting posts 142 for connection of the gearbox.

As shown in FIGS. 1 and 2, extending downwardly from the upper plate 24 is the spindle 26 which is comprised of the rack or shaft 115 and the ice pick disk 143 which has a plurality of ice picks 144 extending downwardly to engage the ice block. A flexible billows 146 is attached to the upper plate and encloses the shaft between the upper plate 24 and the ice pick disk 143. The billows 146 effectively isolates the shaft 115 and any associated lubrication or contaminants originating above the upper plate 24 from the ice block receiving region.

The upper plate 24 is supported by the upper legs 35.1, 35.2, 35.3, 35.4 in a similar manner to the support of the ice block shaving table 22 by the lower legs 30.1, 30.2, 30.3, 30.4. Referring specifically to FIG. 6, the upper legs 35.1, 35.2, 35.3, 35.4 engage and seat into receptacles 145 in the upper plate 24. The threaded rods 43 extend through the interiors 83 of the upper legs, through bores 147 in the upper plate and have nuts 50 attached to the ends 150 of the threaded rods 43.

The lower legs and upper legs may be fabricated from stainless steel tubes or other rigid materials and need not be circular in cross-sectional shape as depicted.

In the preferred embodiment the base 20, the shaving table 22, and the upper plate 24 are aluminum castings. Alternatively, they could be formed of other suitable material such as steel or stainless steel and also may be fabricated by conventional means such as stamping. Vent holes, not shown, may be provided in the housing and upper plate to provide air circulation for the motor. A suitable motor is a conventional one-quarter horsepower 115 VAC motor.

The apparatus operates as follows: Referring to FIGS. 1 and 5C, the spindle 26 is raised by turning the crank 104 which rotates the pinion gear 122 and raises the shaft or rack 115 which is attached to the ice pick disk 143. The shield 36 is opened by sliding same in the ice block shaving table 22. A block of ice is positioned on the ice block shaving plate 70 and the spindle 26 is lowered by rotating the crank 104 until the ice pick disk 143 is embedded into the top of the ice block. The shield 36 is then closed and the motor is activated by way of a switch, not shown, to rotate the ice block on the ice block shaving plate 70. Referring to FIG. 4C, rotation of the ice block on the ice block shaving plate 70 causes the shaving blade 74 to cut into the bottom surface of the ice block producing ice shavings which fall through the opening 72 toward the base 20.

The ice shaving blade 64 may be adjusted by way of a knob 97, as best shown in FIG. 4C, to control the fineness or coarseness of the ice shavings. Rotation of the knob 97 turns the threaded shaft 96 which engages against the clamping piece 86 to pivot said piece about the pin 88 to lower the shaving blade 74 with respect to the ice block shaving plate 70.

The ice shavings are also affected by the downward force of the ice block against the ice block shaving plate 70. Downward force is provided by the weight of the ice block itself and additionally by weight of the spindle 26 including the shaft 115. Referring to FIG. 5C, the downward force provided by the weight of the spindle 26 is controlled by way of the braking mechanism 129. Rotation of the threaded shaft 136 acts to adjustably compress the spring 140 positioned between the plunger 133 with the attached brake shoe 134 and the threaded shaft 136. The compression of the spring 137 varies the contact force between the brake shoe 134 and the brake cylinder 135 which resists the torque on the shaft 128 provided by the weight of the spindle including the shaft or rack 115 engaged with the pinion 122.

After adjustment of the shaving blade mechanism 64 and the braking mechanism 129 for desired fineness or coarseness of the ice shavings, the ice shavings are collected between the base 20 and the ice block shaving table 22 in the shaved ice receiving area or region 30 or are allowed to accumulate on the base 20.

The structural framework of the apparatus cooperates as follows: Referring to FIG. 6, the threaded rods 43 extend from the upper plate 24 through the upper legs 35.1, 35.2, 35.3, 35.4, through the ice block shaving table 22, through the lower legs 30.1, 30.2, 30.3, 30.4, and through the base 20. Nuts 50 are attached to both ends 150 of the threaded rods 43 to provide suitable tension on the rods, and compressive force firmly seating the upper legs and lower legs in the receptacles in the upper plate, the ice block shaving table and the base. The compressive force of the upper legs and lower legs and the firm seating of said legs in the receptacles provides an extremely rigid and structurally sound configuration.

The structural configuration utilizing four upper legs and four lower legs also provides a visually open front 151, sides 152 and back 154 for both the shaved ice receiving area 30 and the ice block receiving region 29.5 as shown in FIGS. 1, 2, 3A, and 4A. The transparency of the shields 36, 37, 37.5 maintains the visually open feature. The shields may be fabricated of conventional transparent rigid plastics.

The apparatus has substantial stability by way of the six feet 58, 58.1 which are attached to the bottom of the base 20 adjacent to the perimeter. The most forward foot 58.1 is placed forwardly beyond the perimeters of the upper plate 24 and the ice block shaving table 22 as best shown in FIG. 5A and 5B. This most forward foot 58.1 provides significant stability by extending the forward pivot point on the base forwardly beyond the ice block shaving plate 70 which receives the weight of an ice block placed on the ice shaving table 22.

The coupling means for coupling the motor to the spindle is depicted as a gearbox 100 in the embodiment described but also includes other conventional couplings such as pulleys, belts, transmissions for variable speed coupling, direct shaft drives, and other types of gearing.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An apparatus for producing ice shavings from a block of ice, the apparatus comprising:
   a) a base;
   b) a plurality of lower legs extending upwardly from the base;
   c) an ice block shaving table, for supporting the ice block, the shaving table positioned above the base and supported by the lower legs, the apparatus having an ice block receiving region above the having table;
   d) an upper plate positioned above the shaving table;
   e) a plurality of upper legs extending upwardly from the shaving table and supporting the upper plate, the legs peripherally positioned on the shaving table whereby substantially all of the ice block receiving region is viewable from all horizontal views around the apparatus and whereby the views into the apparatus are visually unobstructed intermediate the legs;
   f) an openable transparent shield surrounding the ice block receiving region whereby physical access is restricted while preserving visibility of the ice block receiving region from all horizontal views;
   g) a spindle extending downwardly from the upper plate for gripping and rotating the ice block;
   h) a drive motor mounted on the upper plate for rotating the spindle; and
   i) a housing enclosing the motor, the housing not extending below the upper plate.

2. The apparatus of claim 1, wherein the base, the ice block shaving table, and the upper plate all have perimeters and the perimeters are substantially oval shaped.

3. The apparatus of claim 2, wherein the perimeter of the base extends forwardly beyond the perimeter of the ice block shaving table and beyond the perimeter of the upper plate and wherein the apparatus further comprises a lower surface on the base and a plurality of feet attached to said lower surface adjacent to the perimeter of said base, wherein the feet include a forwardly mounted foot, said foot positioned forwardly beyond the perimeter of the ice block shaving table and beyond the perimeter of the upward plate.

4. The apparatus of claim 1, wherein the upper legs are in alignment with the lower legs, the upper legs and lower legs having open interiors and wherein the apparatus further comprises a plurality of rods, each rod having two ends, the rods extending through the upper plate, through the open interiors of the upper legs, through the ice block shaving table, through the open interiors of the lower legs, each rod secured at each end whereby the rods compressively secure together the base, the lower legs, the ice block shaving table, the upper legs, and the upper plate.

5. The apparatus of claim 4, wherein the upper plate further comprises a plurality of receptacles and the upper legs are engaged in the receptacles, wherein the ice block shaving table further comprises a plurality of upper facing receptacles and the upper legs are engaged in the receptacles, wherein the ice block shaving table further comprises a plurality of downward facing receptacles and the lower legs are engaged in said receptacles, wherein the base has a plurality of upper facing receptacles and the lower legs are engaged in said receptacles.

6. The apparatus of claim 1 further comprising a gearbox coupling the motor to the spindle, a rack and pinion mechanism for raising and lowering the spindle, a braking mechanism to provide resistance to the raising and lowering of the spindle, and wherein the motor, the gearbox, the rack and pinion mechanism and the braking mechanism are all mounted on the top surface of the upper plate.

7. The apparatus of claim 1 further comprising a first side, a second side, a front side, a back side, and a transparent shield that engages the lower legs and extends around the shaved ice receiving area from the first side to the back side and to the second side.

8. The apparatus of claim 7, wherein the lower legs are positioned to provide a visually open front, back, first side, and second side relative to the shaved ice receiving area.

9. The apparatus of claim 1 further comprising an ice block shaving plate positioned on the ice block shaving table, a slidable, partially cylindrical transparent shield partially encompassing the ice block shaving plate, and a removable transparent shield engaging the lower legs and configured to enclose the back, and to partially enclose the first and second sides.

10. An apparatus for producing ice shavings from a block of ice, the apparatus comprising:
   a) a front, a back, a first side, and a second side;
   b) a base having a substantially oval perimeter;
   c) an ice block shaving table, the shaving table comprising a circular and planar ice block receiving surface forwardly positioned on the ice block shaving table, the surface having a radially oriented elongate opening;
   d) a shaving blade adjustably mounted underneath the shaving table and angling upward through the elongate opening;
   e) a plurality of lower support legs extending between the base and the support table, the legs supporting the support table above the base, the space between the base and the support table defining a shaved ice receiving area;
   f) an upper plate having a substantially oval perimeter;
   g) a ice pick disk for gripping the block of ice, the disk comprised of a plurality of downwardly extending ice picks;
   h) a shaft connected to the ice pick disk and extending downwardly from the upper plate, the shaft adjustably moveable upwardly and downwardly for engagement of the ice block;
   i) a drive motor mounted on the upper plate and coupled to the shaft for rotating the shaft;
   j) a plurality of upper support legs extending between the ice block shaving table and the upper plate, the upper support legs positioned to be in alignment with the lower support legs whereby the upper plate is supported above the ice block shaving table, the upper plate and ice block support table defining an ice block receiving region, the upper legs further positioned whereby the front, the back, the first side and the second side are all visually open relative to the ice block receiving region and whereby the views intermediate the legs into the apparatus are visually unobstructed; and k) a housing enclosing the motor, the housing attached to and not extending below the upper plate.

11. The apparatus of claim 10, wherein the lower legs are aligned with the upper legs and are positioned to provide a visually open front, back, first side and second side relative to the shaved ice receiving area.

12. The apparatus of claim 10, wherein the base has a plurality of upwardly facing receptacles and wherein the lower legs are seated in the receptacles, wherein the shaving table has a plurality of downwardly facing receptacles and the lower legs are seated in said receptacles, wherein the shaving table has a plurality of upwardly facing receptacles and the upper legs are seated in said receptacles, and wherein the upper plate has a plurality of downwardly facing receptacles and the upper legs are seated in said receptacles.

13. The apparatus of claim 12, wherein the foot in the most forwardly position is positioned forwardly of the perimeter of the ice block shaving table and the upper plate.

14. The apparatus of claim 10, wherein the upper legs and lower legs have open interiors, wherein each upper leg has a corresponding lower leg, and wherein the rods have threaded ends and the apparatus further comprises a plurality of nuts for securing the ends of the rods.

15. The apparatus of claim 10, wherein the base has a lower surface with a most forwardly location and wherein the apparatus further comprises a plurality of feet extending downwardly from the bottom surface adjacent to the perimeter, the feet including a foot positioned at the most forwardly position on the lower surface.

16. An apparatus for shaving a block of ice, the apparatus comprising a base with an upper surface having a plurality of receptacles; a plurality of lower legs with open interiors and with upper ends and lower ends with the lower ends sized to seat in the receptacles, the lower ends seated in said receptacles; an ice block support table, the ice block shaving table having a plurality of downwardly facing receptacles, the receptacles sized to accept the upper ends of the lower legs, the upper ends seated in said receptacles; a plurality of upper legs with open interiors and with upper ends and lower ends; the ice block shaving table further having a plurality of upwardly facing receptacles the receptacles sized to accept the lower ends of the upper legs, said lower ends seated in said receptacles; an upper plate having a plurality of downwardly facing receptacles, the receptacles sized to accept the upper ends of the upper legs, said upper ends seated in said receptacles, a plurality of rods, each rod having two ends and extending through the upper plate, the upper legs, the shaving table, the lower legs, and the base, the rods secured at their ends whereby the upper plate, upper legs, shaving table, lower legs, and the base are compressively secured together;

a spindle extending downwardly from the upper plate;

a drive motor coupled to the spindle for rotating said spindle;

a shaving blade attached to the shaving table whereby when a block of ice is placed on the shaving table and engaged by the rotating spindle, shaved ice is produced.

17. The apparatus of claim 16, wherein the upper legs are aligned with the lower legs.

18. The apparatus of claim 16 further comprising a plurality of threaded rods each with two ends and a plurality of nuts sized for the threaded rods, the threaded rods extending through the upper plate, the ice shaving plate and the base, the nuts engaged on the ends of said threaded rods whereby the upper legs and lower legs are secured in the receptacles.

19. The apparatus of claim 18, wherein the upper legs and lower legs have open interiors and the threaded rods extend through the open interiors of the legs.

20. The apparatus of claim 18 further comprising a rack and pinion mechanism for raising and lowering the spindle, a braking mechanism for regulating the downward motion of the spindle, and a coupling means for coupling the motor to the rack, and wherein the upper plate has an upper surface and the rack and pinion mechanism, the braking mechanism, and the coupling means are all mounted on said upper surface.

21. The apparatus of claim 20 further comprising a single housing that cooperates with the upper plate to enclose the drive motor, the rack and pinion mechanism, the braking mechanism and the coupling means.

22. The apparatus of claim 16, wherein the ice block shaving table and the upper plate define an ice block receiving region and wherein the ice block shaving table and the base define a shaved ice receiving area and wherein the upper legs and lower legs are positioned whereby the ice block receiving region and the shaved ice receiving area are both substantially visible from 360° around the apparatus.

* * * * *